Patented Feb. 14, 1939

2,147,570

UNITED STATES PATENT OFFICE 2,147,570

VAT DYESTUFFS OF THE ANTHRAQUINONE SERIES

Erich Berthold and Joachim Mueller, Ludwigshafen-on-the-Rhine, Germany, assignors to General Aniline Works, Inc., New York, N. Y., a corporation of Delaware No Drawing. Application March 9, 1937, Serial No. 129,818. In Germany February 1, 1934

5 Claims. (Cl. 260—276)

The present invention relates to vat dyestuffs of the anthraquinone series. The application is a continuation-in-part of our copending application Ser. No. 3,190 filed January 23, 1935.

We have found that valuable vat dyestuffs of the anthraquinone series are obtained by preparing aminoanthraquinoneoxazoles having the general formula

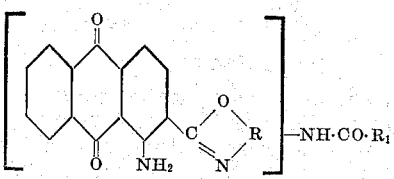

in which R stands for the radical of an anthraquinone and $R_1$ for a vattable radical, and which may contain further amino or acylamino groups in at least one of the anthraquinone radicals.

A great variety of methods may be employed for the preparation of the dyestuffs according to this invention. Thus, for example, 1-amino-4-anthraquinone (O) ylamino - 2 - anthraquinonyl-2'.3'-anthraquinoneoxazole having the formula

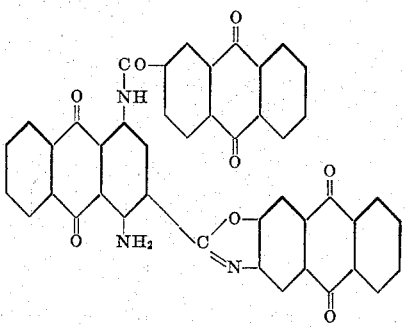

may be prepared as follows:

1-amino-4-halogen- or 1-amino-4-nitro-anthraquinone - 2 - carbonylamino - 2'.3'-hydroxyanthraquinone (obtainable by the condensation of 1-amino-4-halogen- or 1-amino-4-nitroanthraquinone-2-carboxylic acid chloride with 2-amino-3-hydroxyanthraquinone) is converted by heating with ammonia or by reaction with paratoluene sulphamide and subsequent saponification or by reduction into 1.4-diaminoanthraquinone-2-carbonylamino- 2'.3' - hydroxyanthraquinone. By ring closure by means of acid condensing agents, such as sulfuric acid or para-toluene sulfonic acid, there is obtained therefrom 1.4-diamino-2-anthraquinonyl-2'.3'-anthraquinoneoxazole. The 1-amino-4-halogen- or 1-amino-4-nitroanthraquinone - 2 - carbonylamino-2'.3'-hydroxyanthraquinone may also be first converted into the corresponding oxazole derivative, the halogen or nitro groups then being replaced by amino groups. By condensing 1-amino-4-nitroanthraquinone-2-aldehyde with 2-amino-3-hydroxyanthraquinone, for example in nitrobenzene in the present of potassium acetate, 1-amino-4-nitro-2-anthraquinonyl-2'.3'-anthraquinoneoxazole is obtained which can be converted into the corresponding diaminooxazole in the manner already described. Corresponding products may also be obtained by nitration of 1- amino-2-anthraquinonyl-2'.3'-anthraquinoneoxazole and subsequent reduction of the resulting nitro compounds. The 1.4-diamino-2-anthraquinonyl-2'.3'-anthraquinoneoxazole is then converted into the dyestuff having the formula above mentioned by acting thereon with the chloride of anthraquinone-2-carboxylic acid.

Other vat dyestuffs of the said kind may be prepared in an analogous manner.

Thus, for example, the halids of other carboxylic acids of vattable compounds may be employed instead of the chloride of anthraquinone-2-carboxylic acid, for example the chlorides or bromides of carboxylic acids of other anthraquinonic bodies such as anthraquinoneacridones, pyridonoanthraquinones or anthraquinonethioxanthones, furthermore of pyrazolanthrones, thiazoleanthrones, pyridanthrones, anthrapyridines or anthrapyrimidones.

The vat dyestuffs thus obtainable have good properties as regards fastness, dye vegetable fibres usually in red to green shades depending on the number of the amino and/or acylamino groups and their position in the molecule. The dyestuffs according to this invention may also be prepared by causing initial materials of the said kind containing halogen to react with acid amides, as for example benzamide or toluene sulfamide.

The following examples will further illustrate how the said invention may be carried out in practice but the invention is not restricted to these examples. The parts are by weight.

Example 1

40 parts of 1-amino-4-nitro-2-anthraquinonyl-2'.3'-anthraquinoneoxazole (prepared for example by condensation of 1-amino-4-nitroanthraquinone - 2 - carboxylic acid chloride with 2-amino-3-hydroxyanthraquinone and conversion of the resulting 1-amino-4-nitroanthraquinone-2 - carbonylamino - 2'.3' - hydroxyanthraquinone into the corresponding oxazole derivatives by treating with para-toluene sulfonic acid) are heated in the form of a paste with 2000 parts of water and 8 parts of sodium sulfide while stirring at 90° C. until initial material can no longer be detected. The whole is filtered off by suction and freed from sodium sulfide by washing with water. The 1.4-diamino-2-anthraquinonyl-2'.3'-anthraquinoneoxazole obtained is a violet-blue powder which dissolves in concentrated sulfuric acid giving an olive-green coloration and dyes cotton greenish blue shades from a brown-violet vat.

The reduction may also be effected for example with hydrazine hydrate in nitrobenzene. The diamino derivative is then obtained in the form of blue-violet leaflets. If dimethylaniline or another amine of high boiling point such as aniline, toluidine or beta-naphthylamine, be employed instead of hydrazine hydrate, the diamino derivative is also obtained in a pure form. The same compound is also obtained for example by reducing 1-amino-4-nitroanthraquinone-2-carbonylamino-2'.3'-hydroxyanthraquinone with hydrazine hydrate and converting the resulting 1.4-diaminoanthraquinone-2-carbonylamino-2'.3'-hydroxyanthraquinone into the corresponding oxazole derivative.

A mixture of 24 parts of the 1.4-diamino-2-anthraquinonyl-2'.3'-anthraquinoneoxazole prepared according to the first paragraph, 25 parts of anthraquinone-2-carboxylic acid chloride, 500 parts of nitrobenzene and 3 parts of anhydrous pyridine is slowly heated at 150° C. Heating is continued until initial material is no longer detectable. After working up, blue-violet needles are obtained which dissolve in concentrated sulfuric acid giving a brown-yellow coloration dyeing vegetable fibres grey-blue shades of excellent fastness to light from a violet vat.

By employing 1-chloranthraquinone-2-carboxylic acid chloride or 1.4-dichloranthraquinone-2-carboxylic acid chloride or 1.4-dichloranthraquinone-6-carboxylic acid chloride instead of anthraquinone-2-carboxylic acid chloride similar dyestuffs are obtained which dye vegetable fibres likewise grey-blue shades of excellent fastness properties.

By employing 1-aminoanthraquinone-2-carboxylic acid chloride a dyestuff is obtained which dyes vegetable fibres violet shades.

By the reduction of 1-amino-4-nitro-2-anthraquinonyl-6'-chlor-2'.3'-anthraquinoneoxazole of the formula

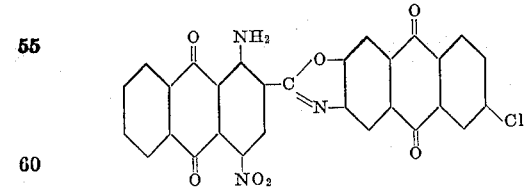

by means of sodium sulfide or the like 1.4-diamino-2-anthraquinonyl-6'-chlor-2'.3'-anthraquinoneoxazole is obtained the acylation products with halides of anthraquinone carboxylic acids of which prepared in a manner corresponding to that described in the preceding paragraph have similar properties.

*Example 2*

10 parts of 1-amino-4-nitro-2-anthraquinonyl-1'(N)-2'(O)-anthraquinoneoxazole (obtainable for example by the condensation of 1-amino-4-nitroanthraquinone-2-carboxylic acid chloride with 1-amino-2-hydroxyanthraquinone and ring closure to form the oxazole in a manner analogous to that described in Example 1) are reduced in 500 parts of water with 20 parts of sodium sulfide in the manner described in Example 1. The 1.4-diamino-2-anthraquinonyl-1'(N)-2'(O)-anthraquinoneoxazole thus obtained is a red-blue powder which dissolves in concentrated sulfuric acid giving an orange coloration and dyes cotton greenish blue shades from a red-violet vat.

Starting from 1-amino-4-nitro-2-anthraquinopyl-3'-chlor-1'(N)-2'(O)-anthraquinoneoxazole (obtainable for example by the condensation of 1-amino-4-nitroanthraquinone-2-carboxylic acid chloride with 1-amino-2-hydroxy-3-chloroanthraquinone and ring closure to form the oxazole according to Example 1) there is obtained by reduction, as for example with alkaline hydrosulfite, the corresponding 1.4-diamino-2-anthraquinonyl-3'-chlor-1'(N)-2'(O)-anthraquinoneoxazole which dyes cotton powerful greenish blue shades from a red-violet vat.

The products obtainable according to the preceding paragraphs are then acylated in a manner corresponding to that described in Example 1 by means of anthraquinone-1(N)-2-1'.2'(N)-benzacridone-5'- or 3'-carboxylic acid chloride. The dyestuffs thus formed are crystalline powders which dye vegetable fibres reddish grey shades from violet vats of excellent fastness properties especially against chlorine.

*Example 3*

A mixture of 30 parts of the compound obtainable by condensing 1 molecular proportion of 1.4-diamino-2.3-dichloranthraquinone and 2 molecular proportions of 1-aminoanthraquinone-2-carboxylic acid chloride in the presence of nitrobenzene at 120° C., 300 parts of nitrobenzene, 15 parts of anhydrous potassium acetate and 0.5 part of copper powder is heated at from 180° to 190° C. until initial material is no longer detectable. The dyestuff which corresponds to the formula

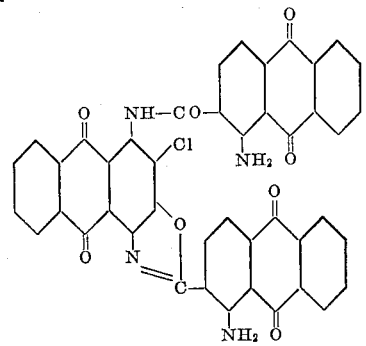

is filtered off by suction, washed with benzene and methanol and dried. It dissolves in concentrated sulfuric acid giving a brown-yellow coloration and dyes vegetable fibres reddish violet shades of very good fastness from a blue-red vat.

*Example 4*

A mixture of 12 parts of the oxazole obtainable according to the first paragraph of Example 1, 10 parts of anthraquinone-1(N).2-1'.2'(N)-benzacridone-5'-carboxylic acid chloride, 250 parts of nitrobenzene and 1 part of pyridine is heated at from 180° to 200° C. until initial material is no longer detectable. After working up, a dyestuff is obtained in the form of blue crystals which dyes vegetable fibres reddish grey shades from a violet vat.

By employing anthraquinone-1(N).2-1'.2'(N)-benzacridone-3'-carboxylic acid chloride a dyestuff having similar properties is obtained.

Similar dyestuffs are obtained by employing 1.9-pyrazoleanthrone-2-carboxylic acid chloride.

*Example 5*

A mixture of 12 parts of the oxazole obtainable according to the first paragraph of Example 1, 10 parts of anthraquinone-1(S).2-1'.2'(S)-benzthioxanthone-3-carboxylic acid chloride, 500 parts of nitrobenzene and 0.5 part of pyridine is heated to 180° C. until initial material is no longer detectable. After working up, a dyestuff is obtained in the form of greenish blue crystals which dissolves in concentrated sulfuric acid giving a reddish yellow coloration. It dyes vegetable fibres bluish grey shades from a violet vat.

By employing 1.9-thiazoleanthrone-2-carboxylic acid chloride a dyestuff having similar properties is obtained.

*Example 6*

A mixture of 10 parts of 1.4-diamino-2-anthraquinonyl-1'(O).2'(N)-anthraquinoneoxazole (obtainable by condensing 1-amino-4-nitroanthraquinone-2-carboxylic acid chloride with 1-hydroxy-2-aminoanthraquinone, ring closure with para-toluene-sulphonic acid in the presence of nitrobenzene and reduction by means of sodium sulphide), 10 parts of 1.4-dichloranthraquinone-2-carboxylic acid chloride and 300 parts of nitrobenzene is heated at from 180° to 200° C., until initial material is no longer detectable. After working up the dyestuff formed is isolated in the usual manner. It dyes vegetable fibres fast blue-grey shades from a violet vat.

What we claim is:

1. Vat dyestuffs of the general formula

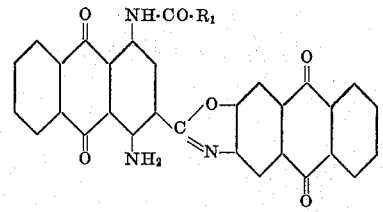

wherein $R_1$ stands for a nuclear radical having an anthraquinone nucleus, a ring of the said nuclear radical being directly combined with the CO-group.

2. Vat dyestuffs of the general formula

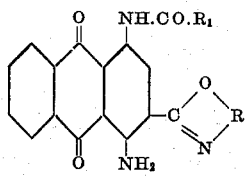

wherein $R_1$ stands for the radical of an anthraquinoneacridone and R stands for an anthraquinone radical, a ring of the said anthraquinoneacridone radical marked $R_1$ being directly combined with the CO-group.

3. The vat dyestuff of the formula

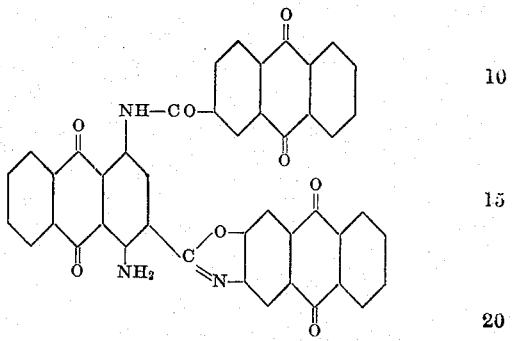

4. The vat dyestuff of the formula

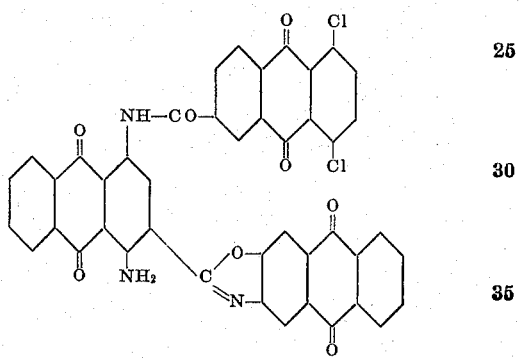

5. The vat dyestuff of the formula

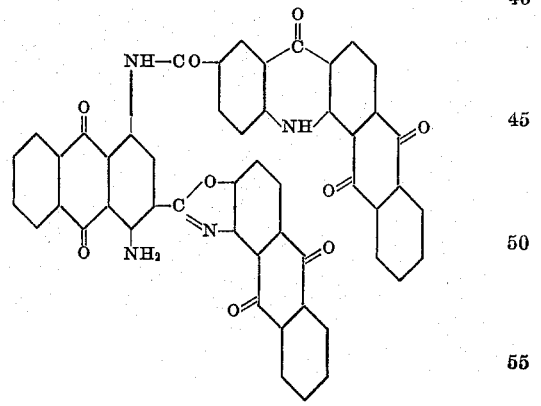

ERICH BERTHOLD.
JOACHIM MUELLER.